L. L. BARTLETT.
CAR STAKE.
APPLICATION FILED FEB. 20, 1913.
1,073,319.
Patented Sept. 16, 1913.
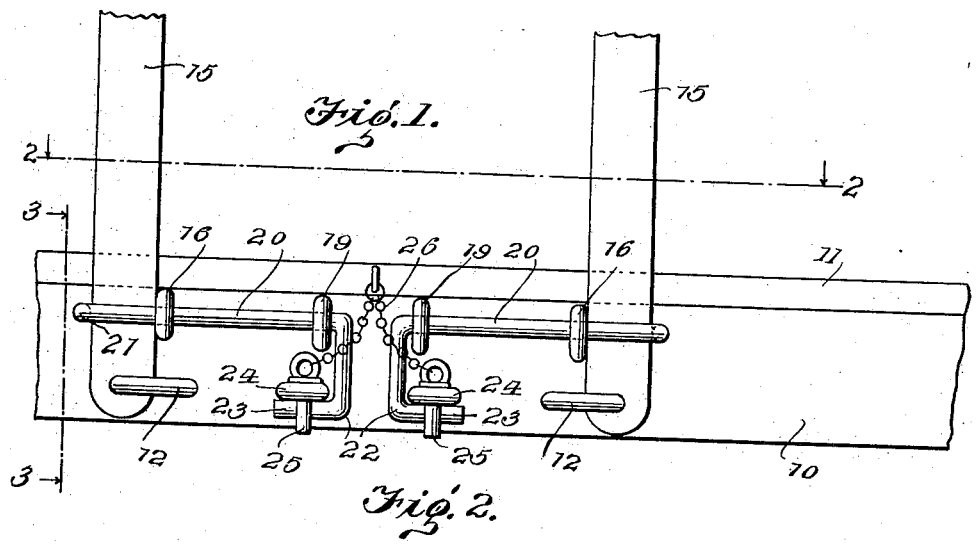
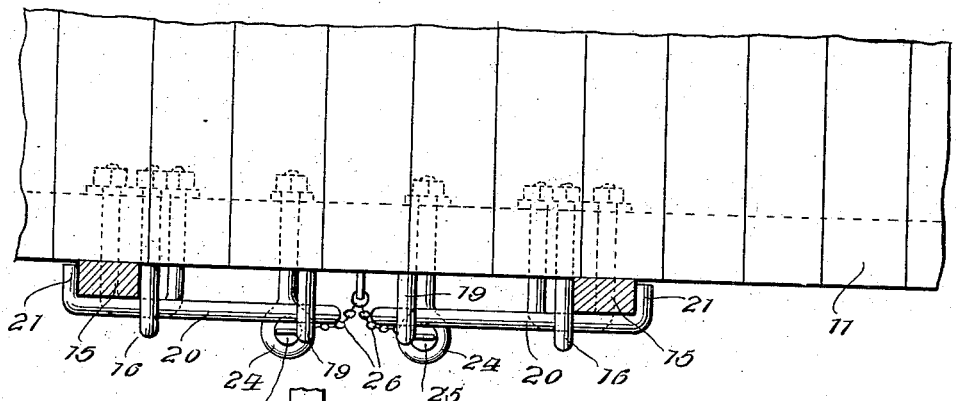
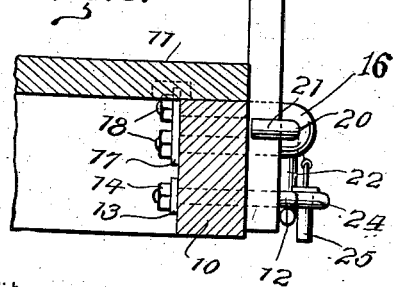
Inventor
Laaren L. Bartlett.
By
Attorneys.

UNITED STATES PATENT OFFICE.

LAAREN L. BARTLETT, OF STURGEON LAKE, MINNESOTA.

CAR-STAKE.

1,073,319.　　　Specification of Letters Patent.　　Patented Sept. 16, 1913.

Application filed February 29, 1913. Serial No. 749,749.

*To all whom it may concern:*

Be it known that I, LAAREN L. BARTLETT, citizen of the United States, residing at Sturgeon Lake, in the county of Pine and State of Minnesota, have invented certain new and useful Improvements in Car-Stakes, of which the following is a specification.

This invention relates to improvements in movable stakes for vehicles, and more particularly to the stakes employed on platform freight cars to retain the load upon the "deck," and has for one of its objects to simplify the construction and increase the efficiency of devices of this character.

Another object of the invention is to provide a simply constructed device of this character which may be folded down when not in use and maintained in elevated position when in use.

With these and other objects in view, the invention consists in certain novel features of construction as hereinafter shown and described, and then specifically pointed out in the claims, and in the drawings illustrative of the preferred embodiment of the invention, Figure 1 is a side elevation of a portion of the frame and deck of a platform car with the improvement applied; Fig. 2 is a plan view of the parts shown in Fig. 1; Fig. 3 is a section on the line 3—3 of Fig. 1, looking in the direction of the arrow; Fig. 4 is a detached perspective view of one of the locking rock shafts.

Corresponding and like parts are referred to in the following description and indicated in all the views of the accompanying drawings by the same reference characters.

The improved device may be applied to any vehicle including a flat platform, such as motor trucks, freight trucks, drays, platform freight cars and the like, in which stakes are employed for holding the load upon the platform, and it is not desired, therefore, to limit the invention in its application to any specific structure, but, for the purpose of illustration, the improved device is shown applied to a portion of the platform and deck of a conventional platform freight car.

A portion of the platform frame is represented at 10 and a portion of the deck at 11. Connected to the frame 10 at points where the stakes are to be located are U-bolts 12 which extend through the frame members 10 and provided at their inner ends with washer plates 13 and clamp nuts 14. The stakes represented at 15 are mounted to swing upon the U-bolts 12 and they are limited in their movement in one direction by combined stop and U-bolts 16, the latter extending through the member 10 and provided at their inner ends with plate washers 17 and clamp nuts 18. Another U-bolt 19 is connected through the member 10 and spaced from the U-bolt 19 and forming bearings in co-action with the U-bolts 16, and extending through the U-bolt bearings is a locking rock shaft 20 which extends over the outer face of the stake 15 and is provided with a lateral offset 21 to bear against the edge of the stake which is located opposite to the combined stop and U-bolt 16. The shaft 20 is likewise provided at its other end with a relatively long offset 22 and a return bend 23, the latter extending in parallel relation to the body of the shaft 20, as shown.

An eye-bolt 24 extends through the member 10 in position to be engaged by the return bend 23 of the shaft when in one position, as shown. The eye-bolt 24 is designed to receive a holding pin 25 which thus locks the shaft 20 in position with the offset 21 engaged against the stake 15 and thus locks the latter in its operative or vertical position. By this arrangement it will be obvious that the shaft 20 performs a two-fold function of holding the stake from outward movement away from the platform of the car and likewise through the action of the offset 21 from movement away from the stop member 16. The stake is thus firmly supported in position and will resist all pressure exerted thereon by the load upon the car. When it is desired to release the stake, it is only necessary to remove the pin 25 from the eye-bolt 24 and turn the portions 22—23 of the shaft outwardly to cause the offset 21 to be turned outward and thus release the stake which may be then turned downwardly upon the U-bolt 12 and be out of the way whenever the load is to be removed or deposited upon the car. Each of the stakes 15 will be provided with one of the stop members 16 and shafts 20 together with its attachments, the shaft of each pair of stakes being preferably arranged to extend toward each other, as shown in Figs. 1 and 2. Small chains 24 are preferably connected to the pins 25 to prevent them from becoming lost when detached from the eye-bolts 24.

The improved device is simple in construction, can be inexpensively applied and operates effectively for the purposes described.

Having thus described the invention what is claimed as new is:

1. The combination with a vehicle including a platform, of stakes mounted to swing upon said platform, a stop to each stake to limit the movement in one direction, and holding means movable through said stops and engaging said stakes and limiting the movement thereof in the opposite direction.

2. The combination with a vehicle including a platform, of stakes mounted to swing upon said platform, a stop to each stake to limit the movement in one direction, holding means movable through said stops and engaging said stakes and limiting the movement thereof in the opposite direction, and locking means applied to said holding means.

3. The combination with a vehicle including a platform, of stakes mounted to swing upon said platform, a stop to each stake to limit the movement in one direction, movable holding means engaging said stakes and limiting the movement in the opposite direction, and locking means applied to said holding means.

4. A stake adapted to swing upon a vehicle platform, a stop for said stake adapted to be connected to a platform and operating to limit the movement of the stake in one direction, movable holding means engaging said stake and limiting the movement thereof in the opposite direction, and locking means applied to said holding means.

5. A stake adapted to swing upon a vehicle platform, a stop for said stake adapted to be connected to a platform and operating to limit the movement of the stake in one direction, holding means movable through said stop and limiting the movement in the opposite direction, and locking means applied to said holding means.

6. A stake adapted to swing upon a vehicle platform, a stop for said stake adapted to be connected to a vehicle platform and operating to limit the movement of the stake in one direction, a shaft adapted to be mounted upon a vehicle platform and rotative through said stop and provided with an offset to engage said stake and limit the movement in the opposite direction.

7. A stake adapted to swing upon a vehicle platform, a stop for said stake adapted to be connected to a vehicle platform and operative to limit the movement of the stake in one direction, movable holding means adapted to be connected to a vehicle platform and operative when in one position to limit the movement of the stake in the opposite direction, and locking means applied to said holding means.

8. A stake adapted to swing upon a vehicle platform, a stop for said stake adapted to be connected to a vehicle platform and operative to limit the movement of the stake in one direction, a bearing spaced from said stop and adapted to be connected to a vehicle platform, a shaft mounted for rotation through said bearing and through said stop and provided with an offset at one end for engaging said stake and limiting the movement thereof in the opposite direction, and locking means applied to said shaft.

In testimony whereof I affix my signature in presence of two witnesses.

LAAREN L. BARTLETT. [L. S.]

Witnesses:
A. A. UPGREN,
FRANK KING.

---

Copies of this patent may be obtained for five cents each, by addressing the "Commissioner of Patents, Washington, D. C."